United States Patent
Van Der Weijden et al.

(10) Patent No.: US 7,726,493 B2
(45) Date of Patent: Jun. 1, 2010

(54) METHOD FOR THE SEPARATION OF NON-FERROUS METAL CONTAINING PARTICLES FROM A PARTICLE STREAM

(75) Inventors: Renata Dorothea Van Der Weijden, Ijsselstein (NL); Peter Carlo Rem, Rijswijk (NL)

(73) Assignee: Technische Universiteit Delft (NL)

( * ) Notice: Subject to any disclaimer, the term of this patent is extended or adjusted under 35 U.S.C. 154(b) by 438 days.

(21) Appl. No.: 10/548,941

(22) PCT Filed: Mar. 16, 2004

(86) PCT No.: PCT/NL2004/000187

§ 371 (c)(1), (2), (4) Date: May 26, 2006

(87) PCT Pub. No.: WO2004/082839

PCT Pub. Date: Sep. 30, 2004

(65) Prior Publication Data

US 2007/0034554 A1      Feb. 15, 2007

(30) Foreign Application Priority Data

Mar. 17, 2003   (NL) ................................. 1022952
Dec. 18, 2003   (NL) ................................. 1025050

(51) Int. Cl.
*B03C 1/00*    (2006.01)
(52) U.S. Cl. ..................... 209/218; 209/12.1
(58) Field of Classification Search ............. 209/8, 209/38, 39, 213, 218, 219, 220, 221, 226, 209/230, 609, 636, 904
See application file for complete search history.

(56) References Cited

U.S. PATENT DOCUMENTS

| | | | |
|---|---|---|---|
| 3,448,857 A | | 6/1969 | Benson et al. |
| 4,166,788 A | * | 9/1979 | Druz et al. ................... 209/39 |
| 4,768,645 A | * | 9/1988 | Farris ........................ 198/499 |
| 4,834,870 A | * | 5/1989 | Osterberg et al. ............ 209/38 |
| 4,941,969 A | * | 7/1990 | Schonert et al. ............. 209/39 |
| 5,394,991 A | * | 3/1995 | Kumagai et al. ........... 209/212 |
| 5,901,910 A | | 5/1999 | Grosso et al. |
| 6,068,133 A | * | 5/2000 | Schonfeld et al. .......... 209/219 |

FOREIGN PATENT DOCUMENTS

| | | |
|---|---|---|
| FR | 2 825 361 A | 12/2002 |
| GB | 2 256 819 A | 12/1992 |
| GB | 2 261 833 A | 6/1993 |
| JP | 2001 137827 A | 5/2001 |

* cited by examiner

*Primary Examiner*—Patrick Mackey
*Assistant Examiner*—Kalyanavenkateshware Kumar
(74) *Attorney, Agent, or Firm*—Akerman Senterfitt

(57) ABSTRACT

The invention relates to a method for the recovery of non-ferrous metal-comprising particles from a particle stream. According to the invention, the particle stream is put onto a conveyor belt in the form of a monolayer such that with the aid of a liquid, at least the non-ferrous metal comprising particles will adhere to the conveyor belt, and the mono-layer is subjected to a magnetic field rotating in the same direction as the belt, for the separation of non-ferrous metal-comprising particles, yielding the non-ferrous-enriched fraction, and subsequent to which the metal particles that are not nonferrous adhering to the conveyor belt are removed, yielding the non-ferrous metal-depleted fraction.

6 Claims, 1 Drawing Sheet

Figure 1:
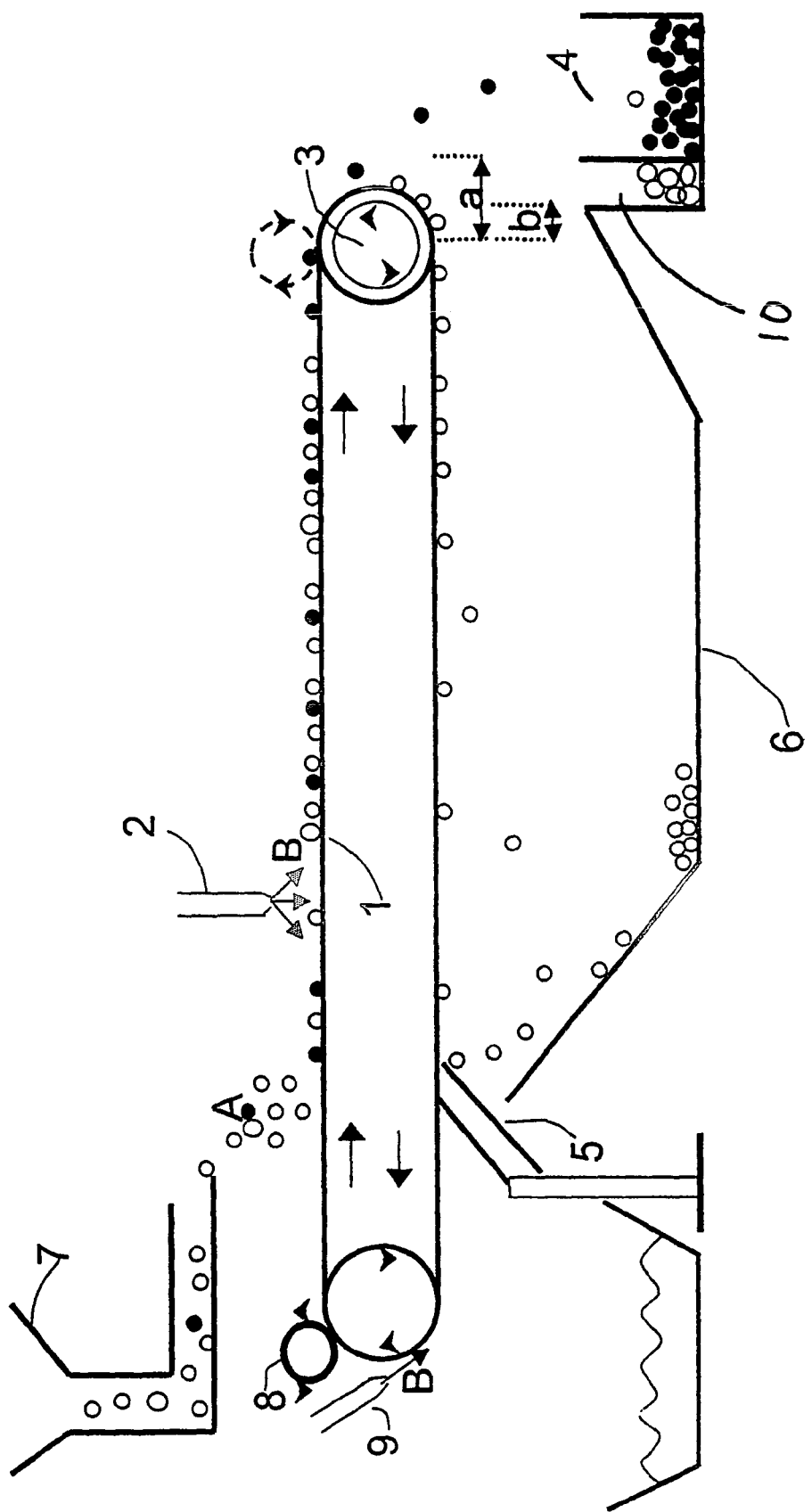

METHOD FOR THE SEPARATION OF NON-FERROUS METAL CONTAINING PARTICLES FROM A PARTICLE STREAM

The present invention relates to a method for the recovery of non-ferrous metal-comprising particles from a particle stream, yielding a non-ferrous metal-enriched fraction and a non-ferrous metal-depleted fraction.

There are various streams, such as waste streams that may include bottom ash produced, for example, during the incineration of domestic waste and that have relatively high contents of one or several metals. The presence of the metals limits the possibilities of using the waste stream or makes dumping relatively expensive. For this reason methods are described in the prior art for the separation of the metals. Ferrous metals are easily separated by means of a magnet. Magnetic field separation of non-ferrous metal transported via a conveyor belt is also known in the prior art, for example, from Rem, P. C., Eddy Current Separation, Eburon, the Netherlands, 1999. This produces a non-ferrous metal-enriched fraction and a non-ferrous metal-depleted fraction. When in the present application reference is made to a metal, this is also deemed to include an alloy of said metal.

The known method has a limited turnover; in the order of a metric ton/hour per meter of conveyor belt width.

It is the object of the present invention to provide a simple and inexpensive method by which non-ferrous metal-comprising particles can be recovered from a particle stream yielding a non-ferrous metal-enriched fraction, which in principle, may be sold as scrap metal. The non-ferrous metal-depleted stream may also have risen in value, making it eligible for reuse.

To this end the present invention provides a method according to the preamble, which is characterised in that it comprises the steps of:

putting the particle stream onto a conveyor belt in the form of a mono-layer such that with the aid of a liquid, at least the non-ferrous metal comprising particles will adhere to the conveyor belt;
   a) subjecting the moist mono-layer on the conveyor belt to a magnetic field rotating in the same direction as the belt, for the separation of non-ferrous metal-comprising particles, yielding the non-ferrous metal-enriched fraction, and
   b) removing the particles adhering to the conveyor belt, yielding the non-ferrous metal-depleted fraction.

It has been found that such a separation greatly enriches the non-ferrous metal fraction with non-ferrous metal. This is quite surprising in view of the fact that the size and form of the particles vary very much. For an optimal separation the particle stream used consists preferably for >90% by weight and more preferably for >98% by weight of particles having a size of <8 mm. Removal from the belt is effected e.g. by heating (evaporation of the liquid), but preferably mechanically, such as by using a brush or knife, or without contact, such as by means of compressed air. Obviously it is important for the belt to be fabricated from a suitable material to allow the particles to adhere to the belt. Surprisingly it was shown however, that with use belts acquire the desirable property on their accord, possibly owing to impurities in the particle stream. Usually the belt will be made of rubber that may or may not be synthetic. Depending on the separation to be carried out, a magnetic field may be chosen with an intensity of, for example, 0.2 Tesla. The amount of liquid used may be such that it is equivalent to a layer of liquid on the conveyor belt of 50-200 micron. For the ordinary person skilled in the art it is absolutely no problem to see whether particles will adhere to the belt, and to adjust the amount of liquid such as to realise suitable adhesion of the particles to the belt. The liquid content of the particle stream on the conveyor belt is, for example, $\geq 5\%$, such as $\geq 10\%$, and advantageously $\geq 12\%$, in relation to the total weight of the particle stream on the conveyor belt. The method according to the invention makes a larger turnover possible (such as 4 tons/hour per meter of belt width), while also facilitating the separation of smaller particles (diameter<5 mm).

According to a preferred embodiment the liquid is water.

Water is a cheap, inert, non-flammable and non-toxic liquid.

The preferred particle stream to use is a particle stream chosen from i) a mixture of plastic and metal, ii) a mixture of salty waste products and a metal chosen from a) magnesium b) aluminium, iii) electronic scrap, and iv) waste products from the incineration of domestic waste.

These areas of application urgently call for the cheap and effective method of separation in accordance with the invention.

A preferred embodiment is characterised in that the mono-layer is exposed to the rotating magnetic field at maximally 210 magnetic field changes per second.

It has been shown that such a frequency is sufficient for loosening non-ferrous metal particles from the belt assuming the particle stream on the belt also contains magnetic (ferrous) particles.

It is preferred for the speed of the conveyor belt to be <1 m/s.

This ensures good separation.

The liquid may optionally comprise an additive, which promotes the adhesion of the particles to the belt. This may possibly be compounds that are soluble in the liquid such as salt (for example sodium chloride) or a polymer (such as starch, polyhydroxyalkyl cellulose, polyvinyl pyrrolidon, etc.). The additive is obviously selected depending on the separation to be carried out, to ensure that the additive does not produce an unacceptably contaminated particle stream. In practice quite low concentrations of such additives usually suffice, if they are necessary at all.

The present invention will now be elucidated by way of the following experiment and with reference to the drawing, wherein the only FIGURE represents an apparatus suitable for carrying out the method according to the invention.

The FIGURE shows a schematic side elevation of an apparatus suitable for carrying out the method according to the invention.

The apparatus shown in the FIGURE comprises a conveyor belt 1 upon which particles A, for example, from a storage hopper 7, are fed continuously distributed on said conveyor belt 1, in an amount such that the particles form a mono-layer or thinner (which means that the belt 1 is not completely covered). If the particles distributed on the conveyor belt 1 are not already moist of their own accord, for example, a sprayer 2 may be provided, which continuously distributes liquid B over the conveyor belt, for instance, by atomisation. The liquid B ensures that the particles A will adhere to the belt. Near one end of the conveyor belt 1 a rotating magnetic field is provided, which in this case is created by a multipolar rotor 3 incorporated in the conveyor belt 1. The multipolar rotor 3 rotates counter to the direction of rotation of the conveyor belt 1, causing particles on the conveyor belt 1 to be exposed to a rotating magnetic field (represented by the dotted lines) that rotates in the same direction as the conveyor belt 1. In this way a force is exerted on non-ferrous metal particles on the conveyor belt 1 with the result that they will jump off and land in a collecting vessel 4. Materials that are not nonferrous metals such as, for example, plastic, sand, ferrous metals and so on may comprise, adhere to the conveyor belt 1 and are removed from the conveyor belt 1 by means of a scraper 5. Instead of a scraper it is also possible to use a brush or an air knife. An air knife is a slit directed toward the conveyor belt 1, blasting compressed air. The particles thus removed from the conveyor belt 1 are also collected in a collecting vessel 6. The distance "a" is chosen such that the fraction collected in the collecting vessel 4 will suffer the least possible contamination from particles that are not nonferrous metals, such as particles that do not, or only insufficiently, adhere to the belt. Simple routine experiments allow the ordinary person skilled in the art to determine a suitable distance "a", depending on the desired purity of the fractions and the desired yield. The particles of the conveyor belt 1 that are not non-ferrous metals do not need to adhere to the conveyor belt 1 before they are at the underside of the conveyor belt 1. On the conveyor belt 1, the particles have a horizontal impulse, which increases the risk that the particles that are not non-ferrous metals will also land in the collecting vessel 4 of the non-ferrous metal particles. This adhesion to the conveyor belt helps to avoid this, even if this adhesive force possibly does not suffice to withstand the gravitational force. The wall separating the collecting vessel 4 and collecting vessel 6 will in such cases be located beyond the distal downstream end of the conveyor belt 1 (i.e. not under the conveyor belt 1). Optionally a collecting vessel 10 is provided for collecting ferrous metal that may possibly be present in the particle stream A. The ordinary person skilled in the art is also able to easily determine the distance b for the particle stream A to be separated.

In the experiments below no sprayer 2 is provided, instead of that the conveyor belt 1 was moistened using a sprayer 9, which was oriented such that fine material still adhering to the conveyor belt 1 and/or liquid, containing solutes originating from the particles A, are washed off the conveyor belt 1. If desired, a roller 8 may be provided for uniformly moistening the conveyor belt 1 and/or for removing excess liquid B on the conveyor belt 1. Said roller 8 may also be a brush, in which case it can also easily rotate counter to the rotational direction of the conveyor belt 1.

Experiment 1

Separation of Non-Ferrous Metals from Bottom Ash.

In the experiment bottom ash from a domestic waste incineration plant was first sifted and subsequently subjected to the separation according to the invention.

Sifting

In a large-scale experiment bottom ash from a waste incineration plant is sifted wet, yielding in addition to a very coarse and a very fine fraction also a 2-6 mm fraction and a 50 micron-2 mm fraction.

Magnetic Separation

The 2-6 mm fraction (feed) was subjected to a treatment with a rotary drum eddy-current separator, under the conditions of Table 1. The data of the feed and the product streams, as estimated from analyses, are presented in Table 2. In this treatment use is made of a separator comprising a magnetic rotor with 18 poles (9 north poles and 9 south poles) wherein the rotor rotated counter to the usual direction at 1000 rotations per minute. Assuming that a field change signifies the complete rotation of the magnetic field of the rotor taking a fixed point, the separation is carried out at (9*1000/60=) 150 field changes per second. The intensity of the field was approximately 0.3 Tesla on the surface of the conveyor belt moving the material over the magnetic rotor. The material was collected at a height of approximately 66 cm below the axis of the rotor in three collecting vessels (product 1 (non-ferrous): more than 45 cm from the rotor axis, product 2 (ferrous): between 30 and 45 cm from the rotor axis, and product 3 (not non-ferrous): less than 30 cm from the rotor axis). When supplying feed, approximately 100 kg of water were added to the wet-sifted fraction in order to increase the moisture content to 15%. The number of field changes per second is unusually low considering the particle size of the feed. However, two control experiments with small amounts of feed (each with 20 kg instead of approximately 1 metric ton; Table 3) show that the amount of recovered non-ferrous in the concentrate is not significantly improved when the rotor velocity is increased to 2000 rpm, whereas at the higher rotor velocity light-magnetic particles are entrained into the non-ferrous fraction, with possible adverse effects for the non-ferrous products.

The particles that adhered to the belt were blasted off the belt with the aid of compressed air and formed a non-ferrous metal-depleted fraction.

TABLE 1 process conditions separation.
Positions in relation to the axis of the rotor.

| | |
|---|---|
| Rotor velocity (rpm) | −1000 |
| Number of poles | 18 |
| Belt velocity (m/s) | 0.94 |
| Belt width (m) | 0.75 |
| Height of baffles (vert. cm) | −66 |
| Position of baffle 1 (hor. cm) | 30 |
| Position of baffle 2 (hor. cm) | 45 |
| Moisture content feed % | 15 |
| Feed (kg) | 1118 |
| Feed velocity (kg/s) | 8.5 |
| Duration process (min) | 20 |

TABLE 2 feed, added water and products from pre-separation.

| | Weight (kg) |
|---|---|
| Feed sifted wet | 1015 |
| Water (added) | 103 |
| Feed dry | 943 |
| Water (total) | 175 |
| Total feed | 1118 |
| Product 1 dry | 28 |
| Product 2 dry | 96 |
| Product 3 dry | 836 |
| Heavy non-ferrous in 3 | Not-detectable |
| Aluminium in 3 | 2.5 |

TABLE 3 results at 1000 rpm (top) and at 2000 rpm (bottom) for products 1, 2, and 3.

| Separation at 1000 rpm | | | | |
|---|---|---|---|---|
| | Non-ferrous tracer | Magnetic | Remaining non-ferrous + stone | Total |
| Product 1 | 38.8 | | 311.4 | 350.2 |
| Product 2 | 40.6 | | 7671.36 | 7711.96 |
| Product 3 | 0.5 | 5798.05 | 5349.95 | 11148.5 |
| Total | 79.9 | 5798.05 | 13332.71 | 19210.66 |

TABLE 3-continued results at 1000 rpm (top) and at 2000 rpm (bottom) for products 1, 2, and 3.

| | Separation at 2000 rpm | | | |
|---|---|---|---|---|
| | Non-ferrous | Magnetic | Remaining non-ferrous + stone | Total |
| Product 1 | 36.11 | 58.28 | 277.92 | 372.31 |
| Product 2 | 38.86 | 476.5 | 6448 | 6963.36 |
| Product 3 | 0.86 | 8036 | 4306 | 12342.86 |
| Total | 75.83 | 8570.78 | 11031.92 | 19678.53 |

The large scale experiment showed that the product that was not non-ferrous (836 kg) contained 2.5 kg of aluminium (i.e. non-ferrous metal), ergo an impurity of only 0.3%.

Experiment 2

Separation of Electronics Scrap

Electronics equipment comprising among other things printer plates, was crushed to a particle size of ≦4 mm and subjected to a separation. The particle stream contained mainly plastic fragments plus aluminium and very fine copper wires (typical diameter: 0.1 mm). To be able to reuse the plastic fraction, it was essential to remove the metal. First the particulate material was sifted using a slot sieve (width 1 mm) to remove the majority of the copper. Apart from the copper, approximately 1-2% of the plastic fragments were also sifted out. The remaining material was subjected to separation as in Experiment 1, with this difference, that the rotor operated at 2000 rpm (300 field changes per second). The higher rotor velocity was chosen because the particle stream did not contain any ferrous metals.

The invention claimed is:

1. A method for the recovery of non-ferrous metal-comprising particles from a particle stream, yielding a non-ferrous metal-enriched fraction and a non-ferrous metal-depleted fraction, wherein the method comprises the steps of:
    a) putting the particle stream onto a conveyor belt in the form of a monolayer with a liquid, such that at least the not non-ferrous metal comprising particles will adhere to the conveyor belt at least partly due to the action of the liquid;
    b) subjecting the moist mono-layer on the conveyor belt to a magnetic field rotating in the same direction as the belt, for the separation of non-ferrous metal-comprising particles which are loosened from the moist mono-layer by the action of the magnetic field, yielding the non-ferrous metal-enriched fraction, and
    c) removing the particles adhering to the conveyor belt from an underside of the conveyor belt, yielding the non-ferrous metal-depleted fraction.

2. A method according to claim 1, wherein the liquid is water.

3. A method according to claim 1, wherein the particle stream is selected from the group consisting of i) a mixture of plastic and metal, ii) a mixture of salty waste products and a metal chosen from a) magnesium b) aluminum, iii) electronic scrap, and iv) waste products from the incineration of domestic waste.

4. A method according to claim 1, wherein the monolayer is exposed to the rotating magnetic field at maximally 210 magnetic field changes per second.

5. A method according to claim 1, wherein the speed of the conveyor belt is <1 m/s.

6. A method according to claim 1, further comprising allowing any ferrous metal-comprising particles to fall from an end of the conveyor belt and collecting the ferrous metal-comprising particles.

* * * * *